US012661896B2

(12) United States Patent
Yano

(10) Patent No.: US 12,661,896 B2
(45) Date of Patent: Jun. 23, 2026

(54) INKJET RECORDING APPARATUS

(71) Applicant: KYOCERA Document Solutions Inc., Osaka (JP)

(72) Inventor: Yuko Yano, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 124 days.

(21) Appl. No.: 18/678,091

(22) Filed: May 30, 2024

(65) Prior Publication Data

US 2024/0408875 A1 Dec. 12, 2024

(30) Foreign Application Priority Data

Jun. 6, 2023 (JP) ................................ 2023-093136

(51) Int. Cl.
*B41J 2/165* (2006.01)
*B41J 2/17* (2006.01)

(52) U.S. Cl.
CPC ....... *B41J 2/16552* (2013.01); *B41J 2/16538* (2013.01); *B41J 2/16544* (2013.01); *B41J 2/16547* (2013.01); *B41J 2/1742* (2024.05); *B41J 2/16535* (2013.01); *B41J 2002/16558* (2013.01); *B41J 2002/16573* (2013.01)

(58) Field of Classification Search
CPC ................ B41J 2/16552; B41J 2/16538; B41J 2/16544; B41J 2/16547; B41J 2/1742; B41J 2/16535; B41J 2002/16558; B41J 2002/16573
See application file for complete search history.

(56) References Cited

U.S. PATENT DOCUMENTS

2020/0016899 A1* 1/2020 Ogasahara ........... B41J 2/16508

FOREIGN PATENT DOCUMENTS

JP 2010-069837 A 4/2010

* cited by examiner

*Primary Examiner* — Geoffrey S Mruk
(74) *Attorney, Agent, or Firm* — Studebaker Brackett PLLC

(57) ABSTRACT

An inkjet recording apparatus includes a head unit, a wipe unit, and a control part. The head unit is provided with a nozzle surface on which a plurality of ink ejection ports is opened downward. The wipe unit performs a wiping operation in which a blade is moved along the nozzle surface while applying a cleaning liquid to the nozzle surface to wipe the nozzle surface. The control part controls the head unit and the wipe unit to perform a first maintenance operation to perform the wiping operation and a second maintenance operation to perform the wiping operation after the ink is pushed out from the nozzle surface. In the second maintenance operation, the cleaning liquid applied to the nozzle surface is suppled firstly, then the ink is pushed out from the nozzle surface, and then wiping operation is performed.

4 Claims, 7 Drawing Sheets

INKJET RECORDING APPARATUS

INCORPORATION BY REFERENCE

This application is based on and claims the benefit of priority from Japanese patent application No. 2023-093136 filed on Jun. 6, 2023 which is incorporated by reference in its entirety.

BACKGROUND

The present disclosure relates to an inkjet recording apparatus including a wipe unit which wipes an ink ejection port of a recording head.

The inkjet recording apparatus is provided with a wipe unit which wipes an ink ejection port of a nozzle of a recording head. The wiping unit includes a blade in contact with a nozzle surface where the ink ejection port opens, and performs a wiping operation for moving the blade from a moving start position to a moving end position to wipe the ink ejection port.

However, even when such wiping operation is performed, the ink adhered to the ink ejection port may dry and be fixed. Therefore, a droplet ejecting apparatus (corresponding to the inkjet recording apparatus) may be provided with a specific means for specifying a position of the fixed object, and may be configured to slow down the movement speed of the blade in the wiping operation at the position specified by the specific means.

However, in the case where the fixing of the ink is advanced, it is insufficient to remove the fixed ink by only slowing down the moving speed of the blade as in the droplet ejecting apparatus described above.

SUMMARY

An inkjet recording apparatus according to the present disclosure includes a head unit, a wipe unit, and a control part. The head unit is provided with a nozzle surface on which a plurality of ink ejection ports is opened downward. The wipe unit performs a wiping operation in which a blade is moved along the nozzle surface while applying a cleaning liquid to the nozzle surface to wipe the nozzle surface. The control part controls the head unit and the wipe unit to perform a first maintenance operation to perform the wiping operation and a second maintenance operation to perform the wiping operation after the ink is pushed out from the nozzle surface. In the second maintenance operation, the cleaning liquid applied to the nozzle surface is suppled firstly, then the ink is pushed out from the nozzle surface, and then wiping operation is performed.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the drawings, an inkjet recording apparatus according to one embodiment of the present disclosure will be described.

Figure 1:
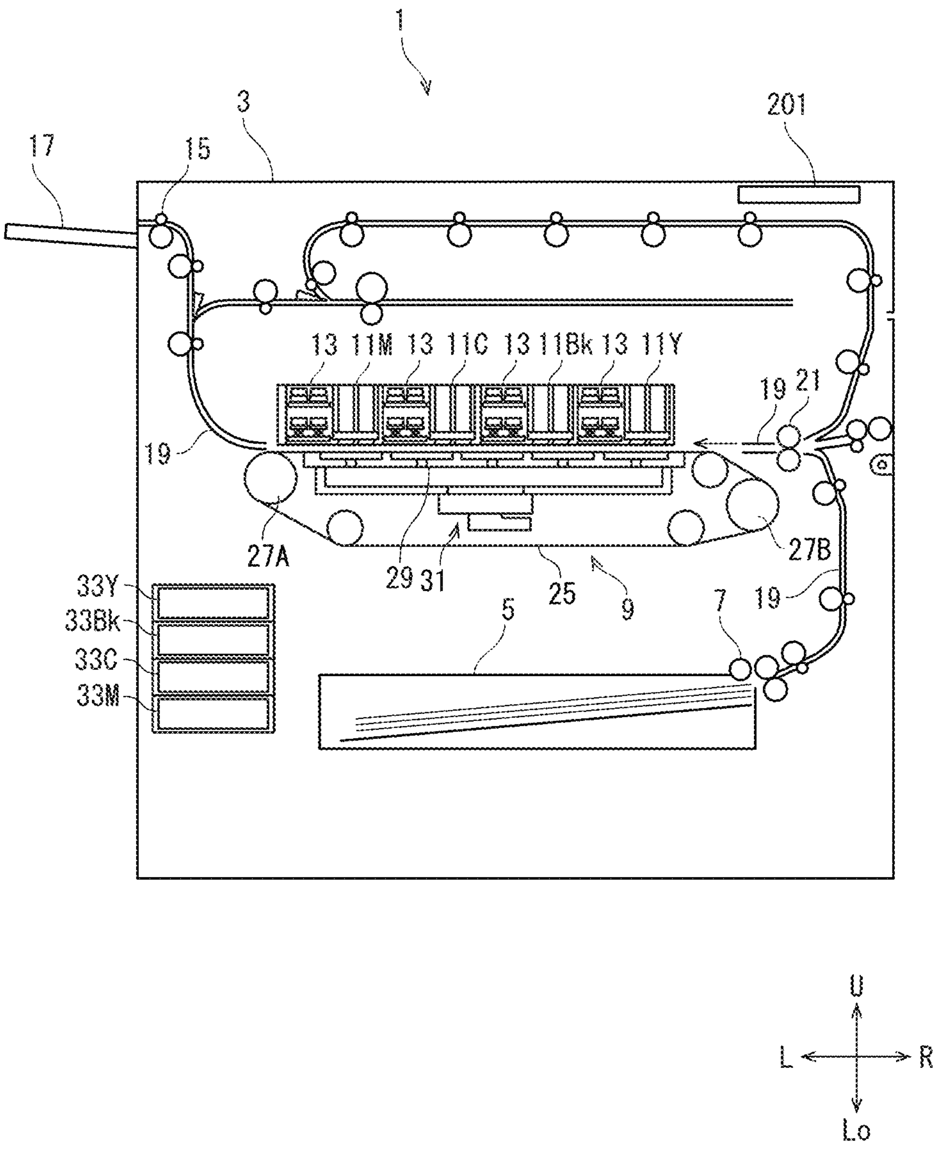
FIG. 1 is a front view schematically showing an inner structure of an inkjet recording apparatus according to one embodiment of the present disclosure.
Figure 2A:
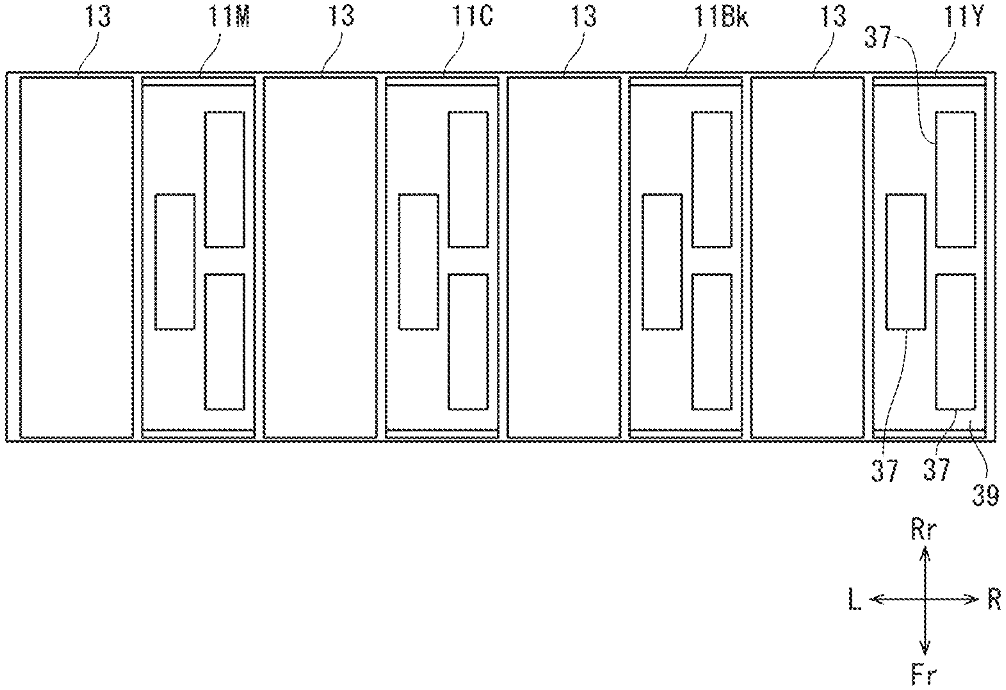
FIG. 2A is a plan view schematically showing head units and maintenance units of the inkjet recording apparatus according to the embodiment of the present disclosure.
Figure 2B:
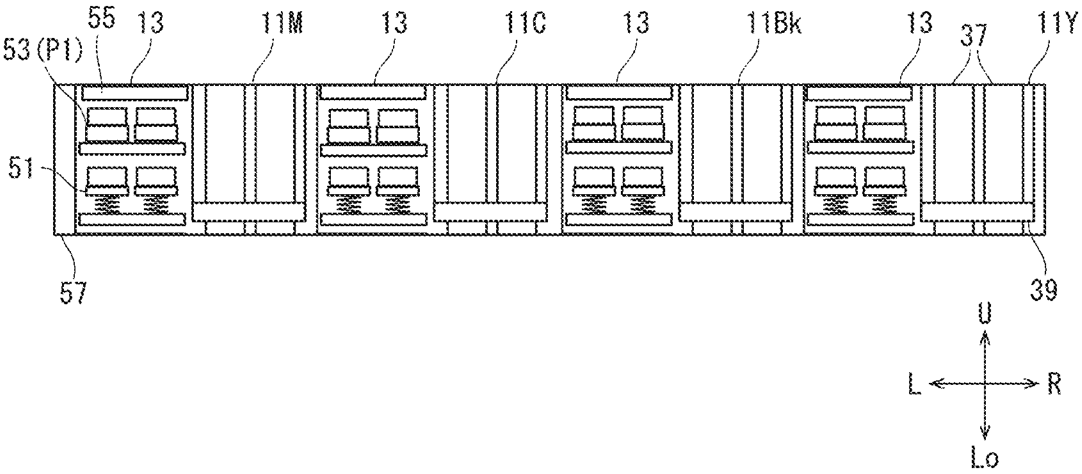
FIG. 2B is a front view schematically showing the head units and the maintenance units of the inkjet recording apparatus according to the embodiment of the present disclosure.

First, the entire configuration of the inkjet recording apparatus 1 will be described with reference to FIG. 1, FIG. 2A, and FIG. 2B. FIG. 1 is a front view schematically showing the inside of the inkjet recording apparatus 1. FIG. 2A is a plan view schematically showing head units 11 and maintenance units 13, and FIG. 2B is a side view schematically showing the head units 11 and the maintenance units 13. Hereinafter, the front side of the paper plane on which FIG. 1 is drawn is defined as the front side of the inkjet recording apparatus 1. In each figure, U, Lo, L, R, Fr, and Rr indicate the upper, lower, left, right, front, and rear, respectively.

As shown in FIG. 1, the inkjet recording apparatus 1 is an inkjet image forming apparatus that forms an image by ejecting ink. The inkjet recording apparatus 1 includes a rectangular parallelepiped body housing 3. In the lower portion of the inside of the body housing 3, a sheet feeding cassette 5 which stores a sheet, such as a plain paper and a coated paper, and a sheet feeding roller 7 which feeds the sheet from the sheet feeding cassette 5 are provided. Above the sheet feeding cassette 5, a conveying unit 9 which conveying the sheet is provided. Above the conveying unit 9, four head units 11M, 11C, 11Bk, and 11Y (collectively referred to as a head unit 11) and four maintenance units 13 are provided (see also FIG. 2A and FIG. 2B). In the left and upper portion of the body housing 3, a discharge rollers pair 15 which discharges the sheet on which an image is formed and a discharge tray 17 on which the discharged sheet is stacked are provided.

Inside the body housing 3, a conveyance path 19 from the sheet feeding cassette 5 through the conveying unit 9 to the discharge rollers pair 15 is provided. On the conveyance path 19, a plurality of conveying rollers pairs 21 for conveying the sheet is provided.

Next, the conveying unit 9 will be described with reference to FIG. 1. The conveying unit 9 includes an endless conveying belt 25. The conveying belt 25 has a number of through-holes penetrating in the thickness direction. The conveying belt 25 is wound around a driving roller 27A and a driven roller 27B arranged at an interval in the left-and-right direction. The driving roller 27A is driven by a motor (not shown) to be rotated. As the driving roller 27A is rotated, the conveying belt 25 travels in the counterclockwise direction of FIG. 1. The conveying belt 25 traveling along an upper track forms the conveyance path 19 along which the sheet is conveyed in a conveyance direction from the right to the left in FIG. 1.

In the inner hollow space of the conveying belt 25, a conveying plate 29 and a suction device 31 are provided. The conveying plate 29 has a number of through-holes penetrating in the thickness direction. The conveying plate 29 is in contact with the inner surface of the conveying belt 25 traveling along the upper track. The suction device 31 is provided below the conveying plate 29, and attracts the sheet to the conveying belt 25 by sucking air through the through-holes of the conveying belt 25 and the through-holes of the conveying plate 29.

Next, the head unit 11 will be described. The four head units 11Y, 11Bk, 11C, and 11M correspond to yellow, black, cyan, and magenta inks, respectively, and are arranged above the conveying unit 9 at predetermined intervals along the conveyance direction. Ink containers 33Y, 33Bk, 33C, and 33M filled with the yellow, black, cyan, and magenta ink, respectively, are connected to the four head units 11. As shown in FIG. 2A and FIG. 2B, the head unit 11 includes three recording heads 37 and a plate 39 for supporting the three recording heads 37.

Figure 3A:
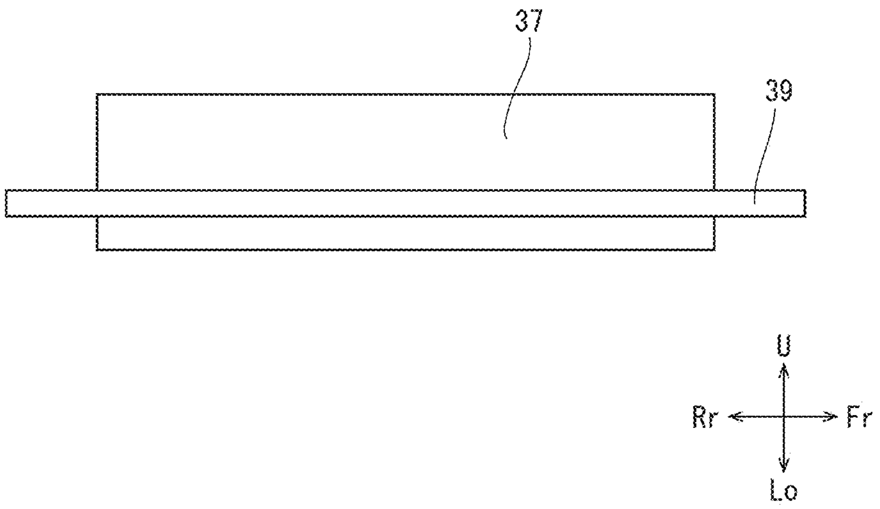
FIG. 3A is a side view showing a recording head of the inkjet recording apparatus according to the embodiment of the present disclosure.
Figure 3B:
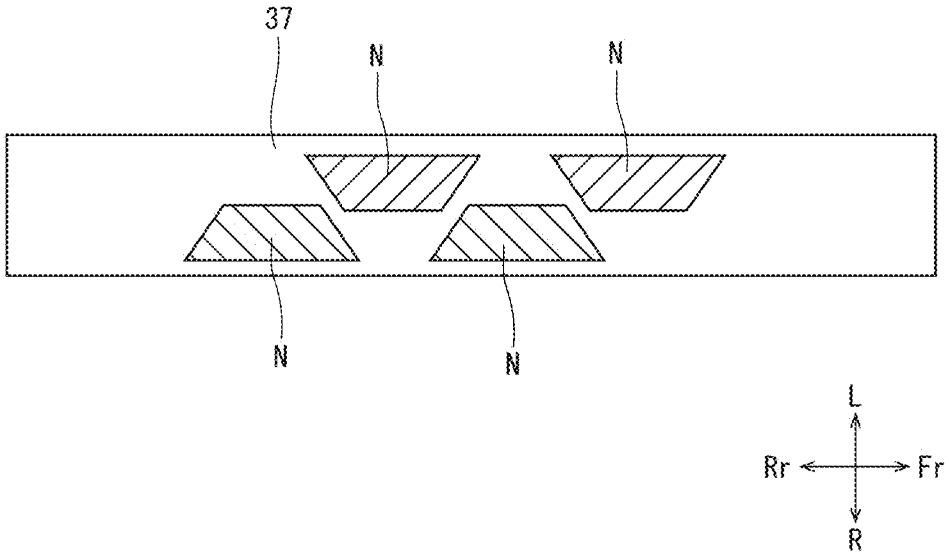
FIG. 3B is a bottom view showing the recording head of the inkjet recording apparatus according to the embodiment of the present disclosure.

The recording head 37 will be described with reference to FIG. 3A and FIG. 3B. FIG. 3A is a side view showing the recording head 37, and FIG. 3B is a bottom view showing the recording head 37. The recording head 37 has a rectangular parallelepiped shape elongated in a width direction (the front-and-rear direction) intersecting the sheet conveyance direction. The recording head 37 includes a number of nozzles (not shown) to which the ink is supplied, and a piezoelectric element (not shown) provided for each nozzle. The discharge ports of the nozzles are opened on the lower surface of the recording head 37. When the piezoelectric element is driven, the ink in the nozzle is ejected downward through the ejection port. As shown in FIG. 3B, the surface including the region N where the ejection ports are opened is defined as a nozzle surface N. The three recording heads 37 are electrically connected to a control part 201 (see FIG. 7).

As shown in FIG. 2A, the three recording heads 37 are arranged in a staggered pattern along the width direction (the front-and-rear direction). Specifically, the two recording heads 37 are arranged side by side in the width direction, and one recording head 37 is arranged adjacent to the two recording heads 37 in the conveyance direction. The recording head 37 is supported such that the lower end portion protrudes from the plate 39 as shown in FIG. 3A.

Each of the four head units 11 is supported by a head unit lifting mechanism 41 (see FIG. 7) so as to be lifted and lowered between a printing position and a retracted position. The printing position is a position where the nozzle surface N of the recording head 37 of the head unit 11 faces the conveying belt 25 traveling along the upper track with a predetermined interval (for example, 1 mm) (see FIG. 1). The retracted position is a position where the nozzle surface N of the recording head 37 of the head unit 11 is separated from the conveying belt 25 higher than the printing position to form a space above the conveying unit 9 in order to accommodate a cap unit 51 and a wipe unit 53 of the maintenance unit 13 described later. The head unit lifting mechanism 41 is electrically connected to the control part 201 (see FIG. 7).

Next, the maintenance unit 13 will be described. The four maintenance units 13 have the same structure, and are provided for the respective four head units 11. The maintenance unit 13 is disposed adjacent to the corresponding head unit 11 in the conveyance direction. In this embodiment, the maintenance unit 13 is disposed on a downstream side (the left side) of the corresponding head unit 11.

As shown in FIG. 2B, the maintenance unit 13 includes the cap unit 51 that covers the nozzle surfaces N of the three recording heads 37 of the head unit 11, a wipe unit 53 that cleans the nozzle surfaces N of the three recording heads 37 of the head unit 11, and a cleaning liquid supply part 55 that supplies cleaning liquid to the wipe unit 53.

The cap unit 51, the wipe unit 53, and the cleaning liquid supply part 55 are supported by a housing 57. The housing 57 is disposed on the downstream side (the left side) of the corresponding head unit 11. The housing 57 has a hollow rectangular parallelepiped shape elongated in the width direction, and a surface (the right surface) facing the corresponding head unit 11 is opened.

Figure 4:
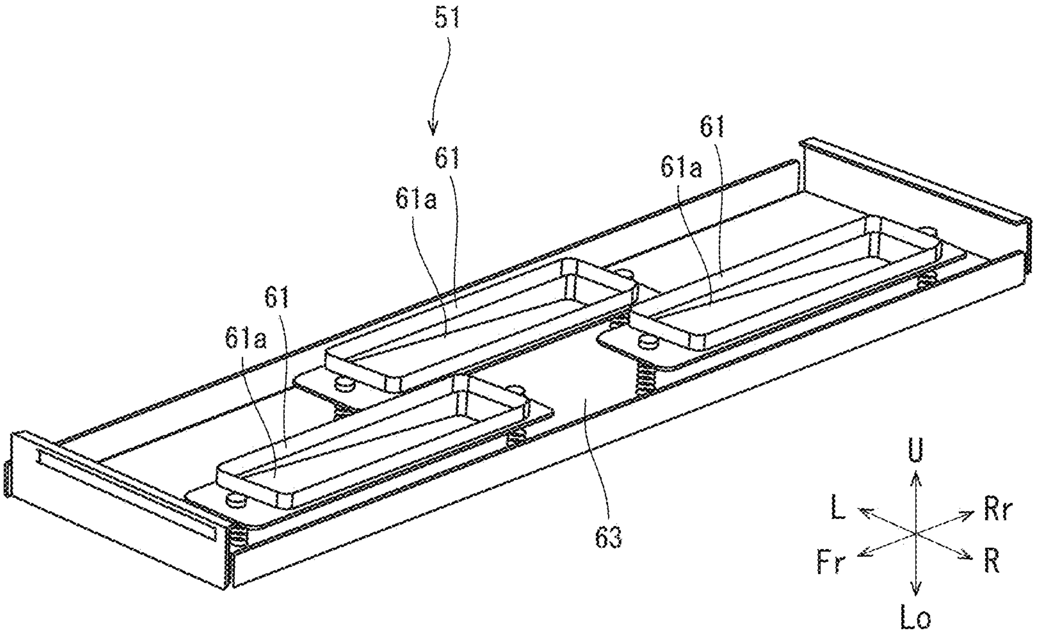
FIG. 4 is a perspective view showing a cap unit of the inkjet recording apparatus according to one embodiment of the present disclosure.

First, the cap unit 51 will be described with reference to FIG. 4. FIG. 4 is a perspective view showing the cap unit 51. The cap unit 51 includes three caps 61 covering the nozzle surfaces N of the three recording heads 37. The three caps 61 are arranged in a staggered pattern along the width direction to correspond to the three recording heads 37 of the head unit 11, and are supported by a support plate 63. The cap 61 has a recess 61*a* having an open upper surface, and a discharge port (not shown) provided at the bottom of the recess 61*a*.

The cap unit 51 can be moved between a standby position (see FIG. 1, FIG. 2A, and FIG. 2B) and a capping position in the conveyance direction and in the opposite direction (the left-and-right direction) by a cap unit moving mechanism (not shown). The standby position is a position where the cap unit 51 is accommodated in the lower space of the housing 57. The capping position is a position where the cap unit 51 is accommodated in the space below the head unit 11 lifted to the retracted position. By moving the cap unit 51 to the capping position and lowering the head unit 11 to a predetermined height, the nozzle surfaces N of the three recording heads 37 are covered with the three caps 61. The cap unit 51 is movable between the capping position and the standby position through the right opened surface of the housing 57.

Figure 5A:
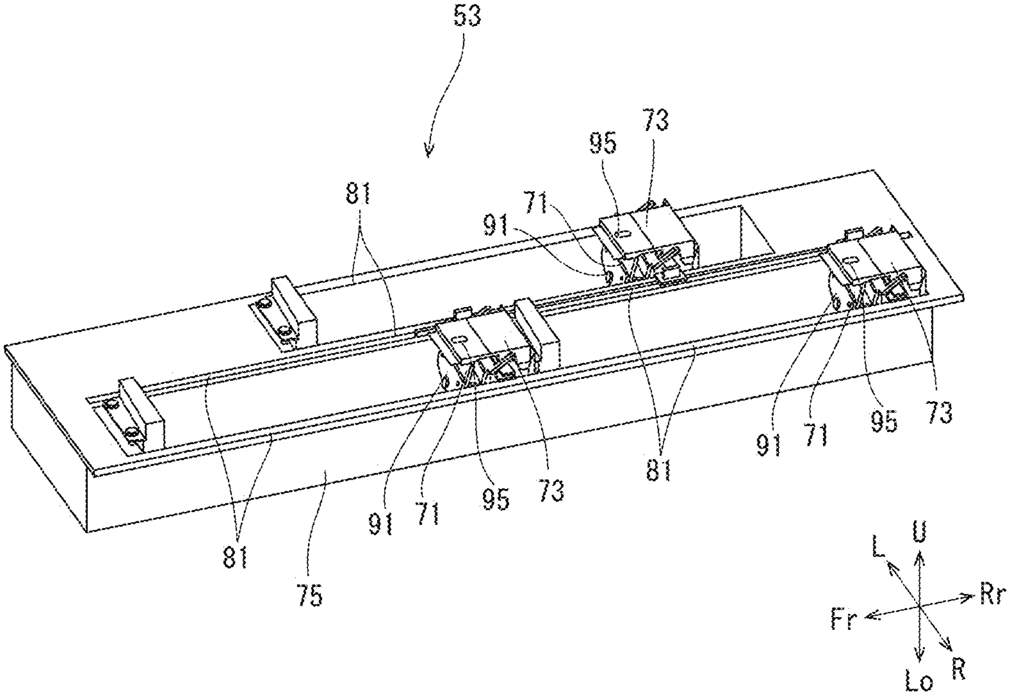
FIG. 5A is a perspective view showing a wipe unit (carriages moved to a moving start position, a waste liquid tray) in the inkjet recording apparatus according to the embodiment of the present disclosure.
Figure 5B:
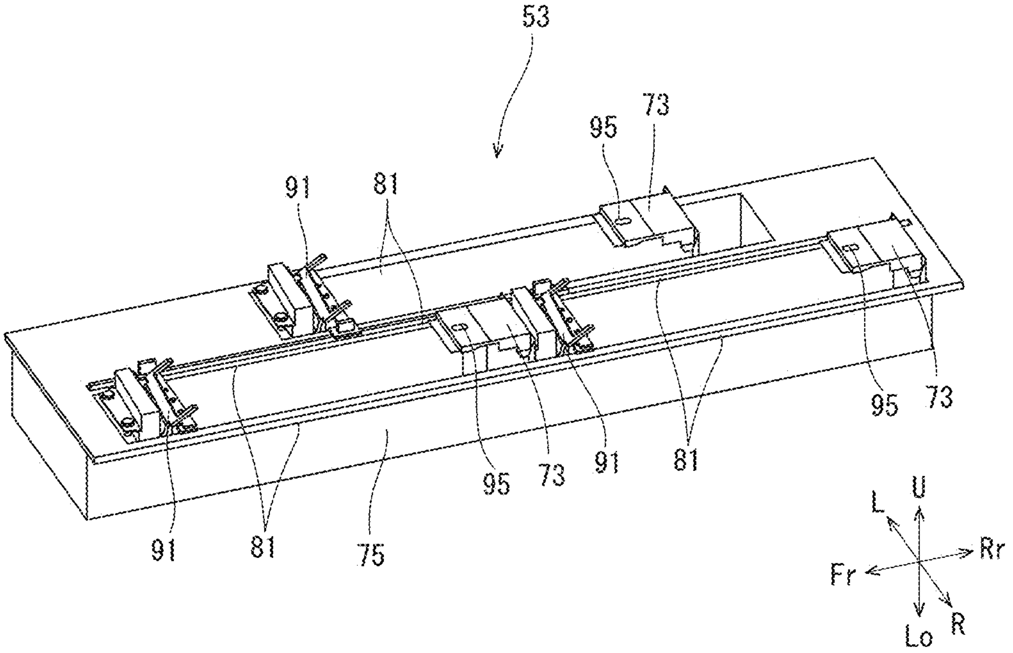
FIG. 5B is a perspective view showing the wipe unit (the carriages moved to a moving end position, the waste liquid tray) in the inkjet recording apparatus according to the embodiment of the present disclosure.
Figure 6A:
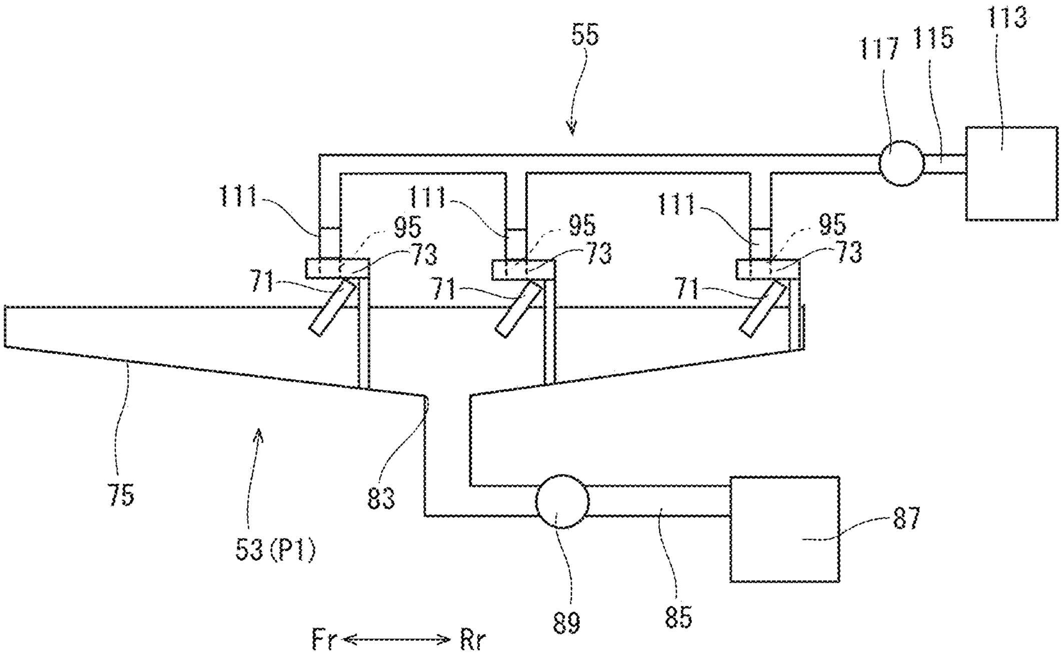
FIG. 6A is a side view schematically showing the wipe unit moved to a standby position, in the inkjet recording apparatus according to the embodiment of the present disclosure.
Figure 6B:
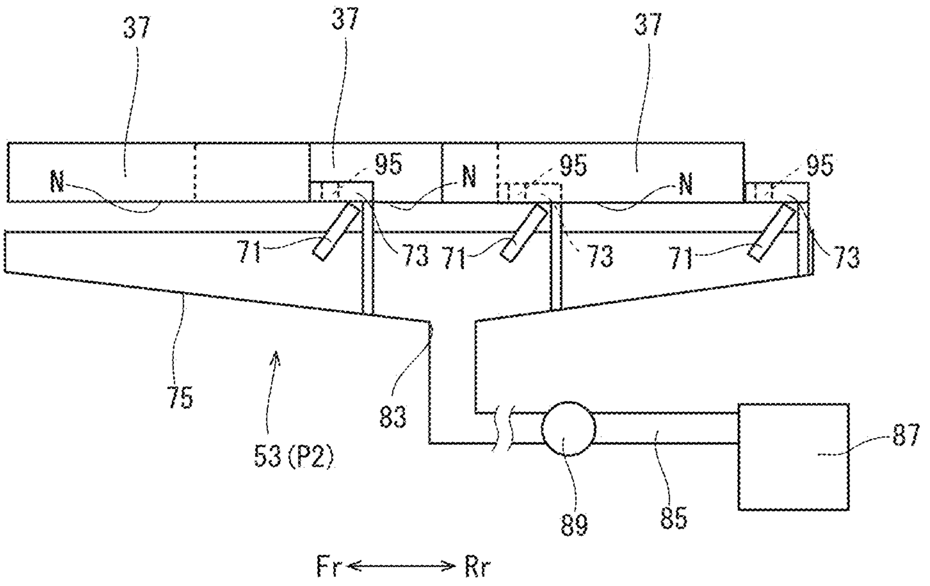
FIG. 6B is a side view schematically showing the wipe unit moved to a wiping position, in the inkjet recording apparatus according to the embodiment of the present disclosure.

Next, the wipe unit 53 will be described with reference to FIG. 5A, FIG. 5B, FIG. 6A, and FIG. 6B. FIG. 5A and FIG. 5B are perspective views showing the wipe unit 53. FIG. 5A shows carriages 91 moved to a moving start position, and FIG. 5B shows the carriages 91 moved to a moving end position. FIG. 6A and FIG. 6B are side views schematically showing the wipe unit 53. FIG. 6A shows the wipe unit 53 moved to a standby position P1, and FIG. 6B shows the wipe unit 53 moved to a wiping position P2.

The wipe unit 53 includes three blades 71 (not shown in FIG. 5B) which wipes the nozzle surfaces N of the three recording heads 37, three cleaning liquid supply members 73 which supplies cleaning liquid applied to the nozzle surfaces N of the three recording heads 37, and a waste liquid tray 75 by which the three blades 71 and the three cleaning liquid supply members 73 are supported and into which the wiped ink and cleaning liquid fall.

First, the waste liquid tray 75 will be described. The waste liquid tray 75 has a bottom plate and a side plate provided along the outer circumference of the bottom plate.

As shown in FIG. 5A and FIG. 5B, the waste liquid tray 75 includes three rails 81 which guide the blades 71 along the front-and-rear direction. The three rails 81 have a length longer than the nozzle surface N of the recording head 37, and are arranged to correspond to the three recording heads 37.

As shown in FIG. 6A and FIG. 6B, a drain port 83 is formed on the bottom plate of the waste liquid tray 75. The drain port 83 is disposed substantially in the center of the bottom plate. The bottom plate is formed so as to incline downward toward the drain port 83. The drain port 83 is connected to a waste liquid tank 87 through a drain pipe 85. The drain pipe 85 is provided with a drain pump 89. The waste liquid tank 87 and the drain pump 89, and the drain pipe 85 between the waste liquid tank 87 and the drain pump 89 are fixedly mounted near the housing 57. On the other hand, the drain pipe 85 between the drain port 83 and the drain pump 89 is flexible, and has a predetermined length as described later. The drain pump 89 is electrically connected to the control part 201 (see FIG. 7).

Next, the blade 71 will be described. The blade 71 is a plate-like member having a width wider than the width of the nozzle surface N of the recording head 37, and is made of flexible resin or the like. The lower ends of the three blades 71 are each supported by a carriage 91 (see FIG. 5A and FIG. 5B).

Figure 7:
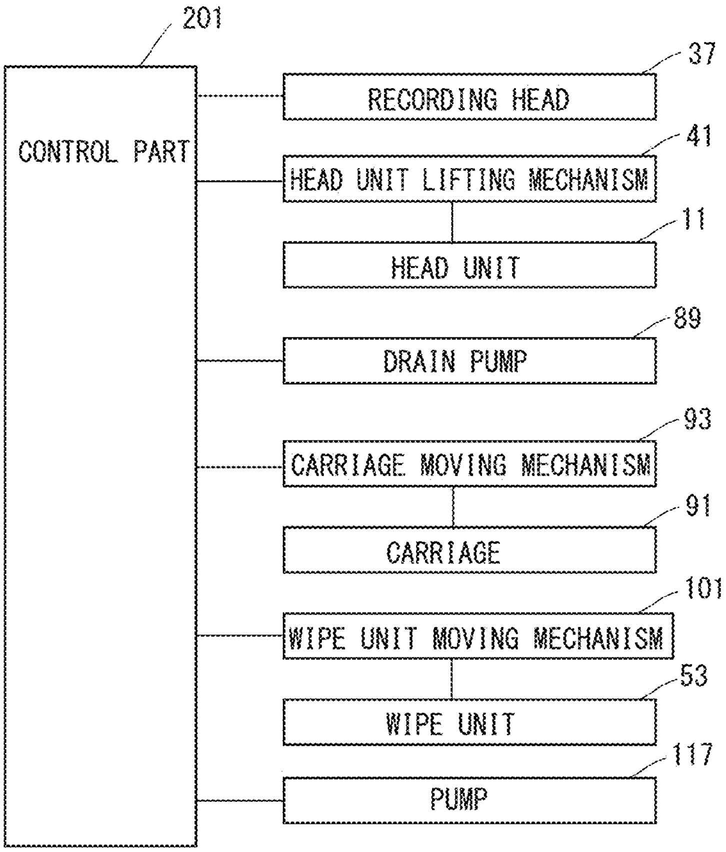
FIG. 7 is a block diagram showing a control part of the inkjet recording apparatus according to the embodiment of the present disclosure.

The carriage 91 is engaged with the rail 81 provided in the waste liquid tray 75, and can be moved in the width direction (the front- and rear direction) between the moving start position (see FIG. 5A) and the moving end position (see FIG. 5B) by a carriage moving mechanism 93 (see FIG. 7). The direction from the moving start position to the moving end position (in this embodiment, the direction from the rear to the front) is defined as a moving direction of the carriage 91 (also referred to as the wiping direction). The carriage moving mechanism 93 is electrically connected to the control part 201 (see FIG. 7).

Next, the cleaning liquid supply member 73 will be described. As shown in FIG. 5A and FIG. 5B, the cleaning liquid supply member 73 is disposed on the rear side of the moving start position of the carriage 91 in the moving direction, and is immovably supported by the waste liquid tray 75. The cleaning liquid supply member 73 has a supply part extending forward in the moving direction of the carriage 91. The supply part has a cleaning liquid supply hole 95 penetrating in the upper-and-lower direction. The cleaning liquid is supplied to the cleaning liquid supply hole 95 from the cleaning liquid supply part 55 described later. The lower surface of the supply part where the cleaning liquid supply hole 95 is opened is defined as the cleaning liquid supply surface. When the carriage 91 is moved to the moving starting position (see FIG. 5A), the supply part extends forward above the blade 71, and the cleaning liquid supply hole 95 is positioned in front of the blade 71. Since the cleaning liquid supply member 73 is immovably supported by the waste liquid tray 75 as described above, the cleaning liquid supply member 73 does not move even if the carriage 91 is moved (see FIG. 5B).

The wipe unit 53 (the blade 71, the cleaning liquid supply member 73, the waste liquid tray 75) can be moved between a standby position P1 (see FIG. 2B and FIG. 6A) and a wiping position P2 (see FIG. 6B) in the conveyance direction and in the opposite direction (the left-and-right direction) by a wipe unit moving mechanism 101 (see FIG. 7). The standby position P1 is a position where the wipe unit 53 is accommodated in the upper space of the housing 57. The wiping position P2 is a position where the wipe unit 53 is accommodated in the space below the head unit 11 lifted to the retracted position. After the head unit 11 is moved to the retracted position, the wipe unit 53 is moved to the wiping position P2, and the head unit 11 is lowered to a predetermined height, so that the blade 71 can be in contact with the nozzle surface N of the recording head 37. The wipe unit 53 is movable between the standby position P1 and the wiping position P2 through the right opened surface of the housing 57. The wipe unit moving mechanism 101 is electrically connected to the control part 201 (see FIG. 7).

Thus, the wipe unit 53 is moved between the standby position P1 and the wiping position P2. Therefore, as described above, the waste liquid tank 87, the drain pump 89, and the drain pipe 85 between the waste liquid tank 87 and the drain pump 89 are fixedly mounted near the standby position P1 of the wipe unit 53 (near the housing 57). On the other hand, the drain pipe 85 between the drain pump 89 and the drain port 83 has a flexibility, as described above, and has a length longer than the moving distance of the wipe unit 53. Thus, when the wipe unit 53 is moved to the wiping position P2, the drain pipe 85 between the drain pump 89 and the drain port 83 extends almost straight. On the other hand, when the wipe unit 53 is moved to the standby position P1, the drain pipe 85 between the drain pump 89 and the drain port 83 is curved in a zigzag or spiral shape.

Next, the cleaning liquid supply part 55 will be described. As shown in FIG. 6A, the cleaning liquid supply part 55 includes three supply ports 111 that can be communicated with the cleaning liquid supply holes 95 of the three cleaning liquid supply members 73 of the wipe unit 53, a cleaning liquid tank 113, a pipe 115 provided between the cleaning liquid tank 113 and the supply port 111, and a pump 117 provided on the pipe 115. The cleaning liquid supply part 55 is provided near the housing 57.

The three supply ports 111 are arranged so as to correspond to the cleaning liquid supply holes 95 of the three cleaning liquid supply members 73 of the wipe unit 53 moved to the standby position P1, and are supported, for example, by a frame-like support member (not shown) provided in the housing 57. When the wipe unit 53 is moved to the standby position P1, the three supply ports 111 are communicated with the cleaning liquid supply holes 95 of the three cleaning liquid supply members 73 of the wipe unit 53 (see FIG. 6A).

The cleaning liquid tank 113 stores the cleaning liquid tank 113. The cleaning liquid is, for example, a liquid consisting mainly of a solvent and water, in which the color material is removed from the ink. Surfactant, preservative or the like may be added as necessary.

The pipe 115 has a main pipe extending along the horizontal direction from the cleaning liquid tank 113 and three branch pipes branching from the main pipe through a joint (not shown). The tip ends of the three branch pipes are bent downward at approximately right angles, and connected to the three supply ports 111.

The pump 117 is provided on the pipe 115 between the cleaning liquid tank 113 and the joint, and pumps the cleaning liquid from the cleaning liquid tank 113 to the pipe 115. The pumped cleaning liquid is sent to the three supply ports 111 through the pipe 115. The pump 117 is electrically connected to the control part 201 (see FIG. 7).

Since the length of the pipe 115 between the pump 117 and the three supply ports 111 is different, the diameter of the pipe 115 is set so that a supply amount (a supply amount per unit time) of the cleaning liquid from each supply port 111 is the same.

Next, the control part 201 will be described with reference to the block diagram of FIG. 7. The control part 201 executes a printing operation for forming an image on the sheet and a head cleaning operation for cleaning the three recording heads 37 of the head unit 11. The operation of the control part 201 in the printing operation will be omitted.

The control part 201 controls the recording head 37 to perform an ink ejection operation to eject the ink from the nozzle surface and an ink holding operation to push out a predetermined amount of the ink from the nozzle surface and then hold it. Further, the control part 201 controls the head unit lifting mechanism 41 to lift or lower the head unit 11 to the retracted position and the printing position. Further, the control part 201 lifts and lowers the head unit 11 to the cleaning position between the printing position and the retracted position.

Further, the control part 201 controls the drain pump 89 to send the waste liquid fallen in the waste liquid tray 75 to the waste liquid tank 87 through the drain pipe 85.

Further, the control part 201 controls the carriage moving mechanism 93 to move the carriage 91 to the moving start position and the moving end position.

Further, the control part 201 controls the wipe unit moving mechanism 101 to move the wipe unit 53 between the standby position P1 and the wiping position P2.

Further, the control part 201 controls the pump 117 to pump the cleaning liquid from the cleaning liquid tank 113 to the pipe 115.

Next, the printing operation and the head cleaning operation of the inkjet recording apparatus 1 having the above configuration will be described.

First, the printing operation will be described with reference to FIG. 1. In the printing operation, the head unit 11 is lowered to the printing position, and the cap unit 51 and the wipe unit 53 are moved to the standby positions. The three supply ports 111 of the cleaning liquid supply part 55 are communicated with the cleaning liquid supply holes 95 of the three cleaning liquid supply members 73 of the wipe unit 53 (see FIG. 6A).

First, the sheet is fed from the sheet feeding cassette 5 by the sheet feeding roller 7. The fed sheet is conveyed to the conveying unit 9 along the conveyance path 19 by the conveying rollers pair 21. The sheet is conveyed along the upper track of the conveying belt 33 of the conveying unit 9. At this time, the ink is ejected from the recording head 37 of the head unit 11 corresponding to image data to the sheet, and an image is formed on the sheet. Thereafter, the sheet is conveyed along the conveyance path 19 by the conveying rollers pair 21, and discharged to the discharge tray 17 by the discharge rollers pair 15.

After the printing operation is finished, the head cleaning operation is performed (description of the capping operation is omitted). As described above, the wipe unit 53 is moved to the standby position P1. As shown in FIG. 6A, the supply ports 111 are communicated with the cleaning liquid supply hole 95*s* of the cleaning liquid supply members 73 of the wipe unit 53.

First, the control part 201 controls the head unit lifting mechanism 41 to lift the head unit 11 to the retracted position.

Thereafter, the control part 103 controls the pump 117 of the cleaning liquid supply part 55 to pump the cleaning liquid from the cleaning liquid tank 113 to the pipe 115. The cleaning liquid is supplied to the cleaning liquid supply holes 95 of the three cleaning liquid supply members 73 through the three supply ports 111 from the pipe 115. The control part 201 drives the pump 117 so as to pump the cleaning liquid until the supplied cleaning liquid is held in a state protruding in a hemispherical shape from the cleaning liquid supply hole 95, and then stops driving the pump 117. The cleaning liquid forms a concave meniscus and held inside the cleaning liquid supply hole 95, except for the head cleaning operation.

Thereafter, the control part 201 controls the wipe unit moving mechanism 101 to move the wipe unit 53 (the blade 71, the cleaning liquid supply member 73, the waste liquid tray 75) from the standby position P1 to the wiping position. At this time, the cleaning liquid supply member 73 is moved while the cleaning liquid protrudes from the cleaning liquid supply hole 95 in a hemispherical shape. Thereafter, the control part 201 controls the head unit lifting mechanism 41 to lower the head unit 11 to the cleaning position. Thus, as shown in FIG. 6B, the nozzle surfaces N of the three recording heads 37 are lowered to the same height position as the cleaning liquid supply surfaces of the cleaning liquid supply members 73 in front of the three cleaning liquid supply members 73 of the wipe unit 53, and the nozzle surfaces N and the cleaning liquid supply surfaces are continuous with almost no gap. In other words, the supply surface of the cleaning liquid supply member 73 is located between the moving start position of the blade 71 and the nozzle surface N. This position is an example of a cleaning liquid supply position in the present disclosure.

Thereafter, the control part 201 controls the carriage moving mechanism 93 to move the carriage 91 from the moving start position to the moving end position. Thus, the wiping operation is performed in which the blade 71 is moved along the nozzle surface N through the supply surface of the cleaning liquid supply member 73. By preforming the wiping operation, the ink remaining on the nozzle surface N is wiped off by the blade 71 together with the cleaning liquid supplied to the supply surface. Thus, the first maintenance operation is performed. The wiped ink and cleaning liquid fall from the lower edge and the side edges of the blade 71 to the lower waste liquid tray 75.

Then, the control part 201 controls the head unit lifting mechanism 41 to lift the head unit 11 from the printing position to the retracted position, and then controls the carriage moving mechanism 93 to move the carriage 91 from the moving end position to the moving start position. Thereafter, the control part 201 controls the wipe unit moving mechanism 101 to move the wipe unit 53 (the blade 71, the cleaning liquid supply member 73, the waste liquid tray 75) from the wiping position P2 (see FIG. 6B) to the standby position P1 (see FIG. 6A). Thus, the cleaning liquid supply holes 95 of the three cleaning liquid supply members 73 are communicated with the three supply ports 111 of the cleaning liquid supply part 55.

Then, as in the first maintenance operation, the control part 201 controls the pump 117 of the cleaning liquid supply part 55 to pump the cleaning liquid from the cleaning liquid tank 113 to the pipe 115. The pumped cleaning liquid is supplied from the pipe 115 through the supply port 111 to the cleaning liquid supply holes 95 of the cleaning liquid supply members 73. The control part 201 drives the pump 117 s to pump the cleaning liquid until the cleaning liquid supplied to the cleaning liquid supply hole 95 is held protruding in a hemispherical shape from the cleaning liquid supply hole 95, and then stops driving the pump 117.

Thereafter, the control part 201 controls the wipe unit moving mechanism 101 to move the wipe unit 53 (the blade 71, the cleaning liquid supply member 73, the waste liquid tray 75) from the standby position P1 to the wiping position P2. At this time, the cleaning liquid supply member 73 is moved while the cleaning liquid protrudes from the cleaning liquid supply hole 95 in a hemispherical shape. Thereafter, the control part 201 controls the head unit lifting mechanism 41 to lower the head unit 11 to the cleaning position. As described above, the nozzle surfaces N of the three recording heads 37 are lowered to the same height position as the supply surfaces of the cleaning liquid supply members 73 in front of the three cleaning liquid supply members 73 of the wipe unit 53, and the nozzle surfaces N and the cleaning liquid supply surfaces are continuous with almost no gap (see FIG. 6B).

Thereafter, the control part 201 controls the three recording heads 37 to push out a predetermined amount of the ink from the nozzle surface and to hold it. Thereafter, the control part 201 controls the carriage moving mechanism 93 to move the carriage 91 from the moving start position to the moving end position, and performs the wiping operation. By performing the wiping operation, the ink held on the nozzle surface N is wiped off by the blade 71 together with the cleaning liquid supplied to the supply surface of the cleaning liquid supply member 73. That is, after the cleaning liquid is held in the cleaning liquid supply hole 95 of the cleaning liquid supply member 73, the ink is pushed out from the nozzle surface N, and then the wiping operation is performed. Thus, the second maintenance operation is performed. The wiped ink and cleaning liquid fall from the lower edge and the side edges of the blade 71 to the waste liquid tray 75 below.

Thereafter, the control part 201 controls the head unit lifting mechanism 41 to lift the head unit 11 to the standby position, controls the carriage moving mechanism 93 to move the carriage 91 to the moving start position, and controls the wipe unit moving mechanism 101 to move the wipe unit 53 from the wiping position P2 to the standby position P1.

When a predetermined amount of the waste liquid is accumulated in the waste liquid tray 75, the control part 201 drives the pump 89 to recover the waste liquid accumulated in the waste liquid tank 87 from the waste liquid tray 75.

As described above, according to the inkjet recording apparatus 1 of the present embodiment, the cleaning liquid is supplied to the nozzle surface N and the inner wall of the nozzle by the first maintenance operation, and the dissolution of the ink fixed to the nozzle surface N and the inner wall of the nozzle is promoted. The dissolved ink can be surely removed by the second maintenance operation performed after the first maintenance operation.

In the second maintenance operation, after the cleaning liquid is held in the cleaning liquid supply hole 95 of the cleaning liquid supply member 73, the ink is pushed out from the nozzle surface N, and the wiping operation is performed. Thus, by supplying the cleaning liquid first in the above way, the wiping operation can be performed immediately after the ink is pushed out from the nozzle surface N. That is, since the time for the ink pushed out from the nozzle surface N to come into contact with the outside air can be shortened as much as possible, the effect of suppressing the drying of the ink is enhanced, especially when the ink is easily dried.

Since the three cleaning liquid supply members 73 are included in the wipe unit 53, when the wipe unit 53 is moved to the wiping position, the supply surface of the cleaning liquid supply member 73 is moved to the cleaning liquid supply position between the moving start position of the blade 71 and the nozzle surface N, and when the wipe unit 53 is moved to the standby position, it moves away from the cleaning liquid supply position. Therefore, when the cleaning liquid supply member 73 is contaminated, the wipe unit 53 can be moved to the standby position P1 and then cleaned.

Further, in the state where the wipe unit 53 is moved to the standby position P1, the cleaning liquid is supplied from the cleaning liquid supply part 55 to the cleaning liquid supply member 73 and held, so that the cleaning liquid supply part 55 can be fixedly mounted near the housing 57. Therefore, the pipe 115 of the cleaning liquid supply part 55 does not bend or extend with the movement of the wipe unit 53. Accordingly, since it is not necessary to prevent the pipe 115 from being pinched or to secure the moving space of the pipe 115, the handling of the pipe 115 can be facilitated.

Further, since the wipe unit 53 includes the waste liquid tray 75 in which the wiped ink falls, the waste liquid (the cleaning liquid and the ink) can be surely recovered, and contamination in the body housing can be prevented.

The first speed at which the blade 71 is moved during the first maintenance operation is preferably lower than the second speed at which the blade 71 is moved during the second maintenance operation. The longer the moving period of the blade 71, the longer the contact period between the fixed ink and the cleaning liquid, and the easier it is to dissolve the fixed ink. However, if the moving period of the blade 71 is lengthened, the workability of the wiping operation is reduced. Therefore, in the first maintenance operation, the moving speed of the blade 71 is slowed down to promote the dissolving of the fixed ink, while in the second maintenance operation, the moving speed of the blade 71 is increased compared to the first maintenance operation to compensate for the degree of deterioration in the workability of the wiping operation.

Further, the three supply ports 111 (the support member for supporting the three supply ports 111) of the cleaning liquid supply part 55 may be supported so as to be movable in the upper-and-lower direction. In this case, when the wipe unit 53 is moved to the standby position P1, the three supply ports 111 are lowered to communicate with the cleaning liquid supply holes 95 of the three cleaning liquid supply members 73, and when the wipe unit 53 is moved to the wiping position P2, the three supply ports 111 are lifted. Thus, the supply ports 111 and the cleaning liquid supply holes 95 can be securely communicated, and since the wipe unit 53 does not interfere with the supply port 111 when the wipe unit 53 is moved, the wipe unit 53 can be moved smoothly.

The present embodiment shows an example in which the maintenance unit 13 is provided for each head unit 11, but, one maintenance unit 13 may be provided for the four head units 11. In this case, the maintenance unit 13 is provided with the four cap units 51, the four wipe units 53, and the cleaning liquid supply part 55. Then, the four cap units 51 is moved between the capping position and the standby position, and the four wipe units 53 and the cleaning liquid supply part 55 are moved between the wiping position and the standby position.

Although the present disclosure has been described in particular embodiments, the present disclosure is not limited to the foregoing embodiments. A person skilled in the art may modify the above embodiments, so long as they do not deviate from the scope and object of the present disclosure.

The invention claimed is:

1. An inkjet recording apparatus comprising:

a head unit provided with a nozzle surface on which a plurality of ink ejection ports is opened downward and movable to a retracted position and a cleaning position;

a wipe unit which includes a blade movable from a moving start position to a moving end position and a cleaning liquid supply member which supplies a cleaning liquid to be applied to the nozzle surface to the blade at the moving start position, and is movable to a standby position and a wiping position; and a control part which controls the head unit and the wipe unit to perform a first maintenance operation to move the wipe unit to the wiping position, then to move the recording head to the cleaning position, and then to perform a wiping operation in which the blade is moved from the moving start position to the moving end position along the nozzle surface while applying the cleaning liquid supplied from the cleaning liquid supply member to the nozzle surface to wipe the nozzle surface, and a second maintenance operation to perform the wiping operation after the ink is pushed out from the nozzle surface, wherein the control part performs the second maintenance operation such that the cleaning liquid applied to the nozzle surface is suppled from the cleaning liquid supply member, then the wipe unit is moved to the wiping position, then the recording head is moved to the cleaning position, then the ink is pushed out from the nozzle surface, and then the wiping operation is performed.

2. The inkjet recording apparatus according to claim 1, wherein when the wipe unit is moved to the wiping position, the cleaning liquid supply member is moved to a cleaning liquid supply position, and when the wipe unit is moved to the standby position, the cleaning liquid supply member is separated from the cleaning liquid supply position and the cleaning liquid can be supplied to the cleaning liquid supply member.

3. The inkjet recording apparatus according to claim 1, wherein the wipe unit includes a waste liquid tray in which the ink wiped off by the wiping operation falls.

4. The inkjet recording apparatus according to claim 1, wherein a first moving speed of the blade at the first maintenance operation is slower than a second moving speed of the blade at the second maintenance operation.

* * * * *